(12) United States Patent
Kneckt et al.

(10) Patent No.: US 8,189,506 B2
(45) Date of Patent: May 29, 2012

(54) DEEP SLEEP MODE FOR MESH POINTS

(75) Inventors: Jarkko Lauri Sakari Kneckt, Espoo (FI); Mika Kasslin, Espoo (FI)

(73) Assignee: Nokia Corporation, Espoo (FI)

(*) Notice: Subject to any disclaimer, the term of this patent is extended or adjusted under 35 U.S.C. 154(b) by 695 days.

(21) Appl. No.: 12/283,101

(22) Filed: Sep. 8, 2008

(65) Prior Publication Data

US 2009/0067373 A1 Mar. 12, 2009

Related U.S. Application Data

(60) Provisional application No. 60/993,663, filed on Sep. 12, 2007.

(51) Int. Cl.
*H04B 7/185* (2006.01)
(52) U.S. Cl. ........ 370/318; 455/13.4; 455/522; 455/574
(58) Field of Classification Search .................. 370/318; 455/13.4, 522, 574
See application file for complete search history.

(56) References Cited

U.S. PATENT DOCUMENTS

| 7,848,277 B2 * | 12/2010 | Chou et al. ..................... | 370/318 |
| 2006/0251004 A1 | 11/2006 | Zhong et al. .................. | 310/318 |
| 2006/0285528 A1 * | 12/2006 | Gao et al. ...................... | 370/338 |
| 2007/0129093 A1 * | 6/2007 | Chou et al. ..................... | 455/522 |
| 2007/0133448 A1 | 6/2007 | Gao et al. ...................... | 370/311 |
| 2007/0207841 A1 * | 9/2007 | Amerga et al. ................ | 455/574 |
| 2009/0122736 A1 * | 5/2009 | Damnjanovic et al. ....... | 370/311 |

FOREIGN PATENT DOCUMENTS

| EP | 1 608 191 A2 | 12/2005 |
| TW | 200723770 A | 6/2007 |

OTHER PUBLICATIONS

Standard ECMA-368, 1$^{st}$ Edition/Dec. 2005, "High Rate Ulta Wideband PHY and MAC Standard", ECMA International Organization.
IEEE P802.11s/D1.08, Draft STANDARD for Information Technology—Telecommunications and information exchange between systems—Local and metropolitan area networks—Specific requirements Part II: Wireless LAN Medium Access Control (MAC) and Physical Layer (PHY) specifications: Mesh Networking IEEE Jan. 2008.
IEEE 802.11-1999 reaff 2003, secons 11.1.2.1 and 11.1.2.2.
"Optimal ATIM Size for 802.11 networks in ad hoc mode", Xia Gao, et al., DoCoMo Communications Lab USA (2006).

* cited by examiner

*Primary Examiner* — Albert T Chou
(74) *Attorney, Agent, or Firm* — Harrington & Smith

(57) ABSTRACT

Disclosed herein is an apparatus, method and computer program embodied in a computer-readable memory medium. The method includes transmitting a beacon or a directed transmission from a first device to inform at least one second device in a wireless communication network that the first device will be active only during an active time interval that comprises a beacon transmission period and an additional period near to the beacon transmission period and, at the completion of the active time interval, operating in a lower power mode of operation until a next active time interval. The wireless communication network may be embodied as a mesh network that includes a plurality of mesh points, and the first device and the at least one second device may each be a mesh point.

35 Claims, 6 Drawing Sheets

THE SOURCE AND THE DESTINATION OF THE MSDUs
IS WITHIN 1-HOP NEIGHBORHOOD
NO FORWARDING, ROUTING OR LINK METRIC IS USED

DEEP SLEEP MODE FOR MESH POINTS

CLAIM OF PRIORITY FROM COPENDING PROVISIONAL PATENT APPLICATION

This patent application claims priority under 35 U.S.C. §119(e) from Provisional Patent Application No. 60/993,663, filed Sep. 12, 2007, the disclosure of which is incorporated by reference herein in its entirety.

TECHNICAL FIELD

The exemplary and non-limiting embodiments of this invention relate generally to wireless communication systems, methods, devices and computer program products and, even more specifically, relate to WLAN mesh networks and power saving techniques.

BACKGROUND

Various abbreviations that appear in the specification and/or in the drawing figures are defined as follows:
AP access point
ATIM announcement traffic indication message
MAC medium access control
IBSS independent basic service set
MSDU MAC service data unit
MPDU MAC protocol data unit
MP mesh point
MESH DTIM MESH delivery traffic indication message
SAP service access point
STA station
UWB ultra-wideband
WLAN wireless local area network Two publications of interest to the ensuing description include:
(A) Standard ECMA-368, 1st Edition/December 2005, High Rate Ultra Wideband PHY and MAC Standard; and
(B) IEEE P802.11s™/D1.03, Draft STANDARD for Information Technology-Telecommunications and information exchange between systems-Local and metropolitan area networks-Specific requirements-Part 11: Wireless LAN Medium Access Control (MAC) and Physical Layer (PHY) specifications: ESS Mesh Networking (April 2007).

As defined in the ECMA-368 Standard a beacon group (BG) is a set of devices from which a device receives beacons that identify the same beacon period start time (BPST) as the device. A beacon period (BP) is the period of time declared by a device during which it sends or listens for beacons. A beacon period start time (BPST) is the start of the beacon period. Coordination of devices within radio range is achieved by the exchange of beacon frames. Periodic beacon transmission enables device discovery, supports dynamic network organization, and provides support for mobility. Beacons provide the basic timing for the network and carry reservation and scheduling information for accessing the medium.

As described in the IEEE P802.11s™ Draft Standard, in section 5.2.9.1 "Introduction to mesh", in WLAN deployments without mesh services, stations (STAs) must associate with an AP in order to gain access to the network. These STAs are dependent on the AP with which they are associated to communicate. An example of a non-mesh WLAN deployment model and device classes are illustrated herein in FIG. 1, which reproduces Figure s1 of the IEEE P802.11s™ Draft Standard.

Many WLAN devices can benefit from support for more flexible wireless connectivity. Functionally, the DS of an AP can be replaced with wireless links or multi-hop paths between multiple APs. Devices traditionally categorized as clients can benefit from the ability to establish peer-to-peer wireless links with neighboring clients and APs in a mesh network.

An example mesh is illustrated in FIG. 2, which reproduces Figure s2 of the IEEE P802.11s™ Draft Standard. Mesh points (MPs) are entities that support mesh services, i.e., they participate in the formation and operation of the mesh network. An MP may be collocated with one or more other entities (e.g., AP, portal, etc.). The configuration of an MP that is collocated with an Access Point is referred to as a Mesh Access Point (MAP). Such a configuration allows a single entity to logically provide both mesh functionalities and AP functionalities simultaneously. STAs associate with APs to gain access to the network. Only MPs participate in mesh functionalities such as path selection and forwarding, etc. Mesh portals (MPPs) interface the network to other IEEE 802 LAN segments.

As is stated in section 5.2.9.2, "Mesh network model", of the IEEE P802.11s™ Draft Standard, a mesh network is an IEEE 802 LAN comprised of IEEE 802.11 links and control elements to forward frames among the network members. Effectively, this means that a mesh network appears functionally equivalent to a broadcast Ethernet from the perspective of other networks and higher layer protocols. Thus, it normally appears as if all MPs in a mesh are directly connected to the link layer. This functionality is transparent to higher layer protocols. Reference in this regard can be made to FIG. 3A, which reproduces Figure s-3 of the IEEE P802.11s™ Draft Standard. It should be noted that while this Figure shows the forwarding of data over multiple hops, there may also be direct data transfer over a single hop, such as is shown in FIG. 3B, wherein the source and destination of the MSDUs are within a one-hop neighborhood, and where no forwarding, routing or link metric need be used.

An ATIM period, which may also be referred to without loss of generality as an "awake window", is the time period after target beacon transmission time (TBTT) during which frames delivery initiation messages may be transmitted. An ATIM frame is used after a beacon frame to initiate frames transmission. An IBSS mode has beacons, similarly as in infrastructure mode. IBSS beacon transmission and infrastructure beacon transmission rules differ. In infrastructure beaconing one AP transmits one beacon, while in IBSS multiple stations compete for a beacon transmission opportunity, and a given station either receives a beacon from another station in the same IBSS network or transmits a beacon. Reference in this regard may be had to IEEE 802.11-1999 reaff 2003, sections 11.1.2.1 and 11.1.2.2.

802.11s specifies that the ATIM period (awake window) is used after the infrastructure or IBSS beacon, if the MP operates in power save mode.

The packet sets the synchronization of the group and announces that messages are waiting to be delivered. Stations in power save mode wake up periodically to listen for ATIM packets in ad hoc (IBSS) networks, just as they do for Beacon packets in infrastructure (BSS or ESS) networks.

A power-consumption problem exists in the foregoing and other types of wireless networks that is related to a need to minimize the activity time of a MP, such as the periodic media listening time of the MP. The receiving of the beacons of other MPs can consume a significant amount of power, especially if the beacons are transmitted separately, each at its own appointed time. The power consumption problem is particularly of concern in battery powered MPs.

As currently specified the MP is expected to receive all peer MPs beacons, i.e., all MPs to which the local MP has a link, and remain active during its own beacon plus the ATIM period time.

The above-referenced ECMA-368 Standard provides two power management modes in which a device can operate: active and hibernation. Devices in active mode transmit and receive beacons in every superframe. Devices in hibernation mode hibernate for multiple superframes and do not transmit or receive in those superframes. In addition, the ECMA-368 Standard provides facilities to support devices that sleep for portions of each superframe in order to save power. To coordinate with neighbors, a device indicates its intention to hibernate by including a Hibernation Mode IE in its beacon. The Hibernation Mode IE specifies the number of superframes in which the device will sleep and will not send or receive beacons or any other frames. Section 17.13, "Power Management Mechanisms", of the ECMA-368 Standard is incorporated by reference herein in its entirety.

Three representative publications that generally address power management in IEEE 802.11 networks include:
"Optimal ATIM size for 802.11 networks in ad hoc mode", X. Gao et al., DoCoMo Communications Lab USA (2006);
US Patent Publication No.: 2007/0133448, Jun. 14, 2007, "Method and Apparatus for Optimal ATIM Size Setup for 802.11 Networks in an Ad Hoc Mode", X. Gao et al.; and
US Patent Publication No.: 2006/0251004, Nov. 9, 2006, "Power Management in an IEEE 802.11 IBSS WLAN Using an Adaptive ATIM Window", Z. Zhong et al.

SUMMARY

The foregoing and other problems are overcome, and other advantages are realized by the use of the exemplary embodiments of this invention.

In a first aspect thereof these exemplary embodiments provide a method that comprises transmitting a transmission from a first device to inform at least one second device in a wireless communication network that the first device will be active only during an active time interval that comprises a beacon transmission period and an additional period near to the beacon transmission period and, at the completion of the active time interval, operating in a lower power mode of operation until a next active time interval.

In another aspect thereof these exemplary embodiments provide an apparatus that comprises a wireless transmitter and a receiver and a controller configurable to transmit a transmission from a first device to inform at least one second device in a wireless communication network that the first device will be active only during an active time interval that comprises a beacon transmission period and an additional period near to the beacon transmission period. The controller is further configurable, at an expiration of the active time interval, to cause the first device to enter a lower power mode of operation until a next active time interval.

In yet another aspect thereof these exemplary embodiments provide a computer-readable memory medium that stores program instructions. The execution of the program instructions results in operations that comprise transmitting a transmission from a first device to inform at least one second device in a wireless communication network that the first device will be active only during an active time interval that comprises a beacon transmission period and an additional period near to the beacon transmission period and, at the completion of the active time interval, operating in a lower power mode of operation until a next active time interval.

In a still further aspect thereof these exemplary embodiments provide an apparatus that comprises means for transmitting in a transmission from a first device for informing at least one second device in a wireless communication network that the first device will be active only during an active time interval that comprises a beacon transmission period and an additional period near to the beacon transmission period. The apparatus further comprises means, responsive to a completion of the active time interval, for controlling the first device to operate in a lower power mode of operation until a next active time interval. When operating in the lower power mode the first device does not receive a beacon transmission from the at least one second device.

DETAILED DESCRIPTION

In one aspect thereof the exemplary embodiments of this invention specify a mechanism to indicate that the MP is active only during its own beacon transmission and ATIM period duration.

The exemplary embodiments of this invention specify a new bit which can be referred to for convenience, and not as a limitation, as a "deep sleep" bit. The deep sleep bit may be used in a WLAN capability field. The deep sleep bit set to 1 (asserted) indicates that the MP stays active only during its own beacon transmission and ATIM period. If the deep sleep bit is set to 0 (not asserted), the MP receives beacons from all other MPs, and stays active during its own beacon transmission and ATIM period. Preferably, the deep sleep bit is sent by the MP during its beacon frame transmission (or in a directed frame transmission) for informing peer MPs of whether the MP will be operating in a conventional manner, and receiving their beacons (as in FIG. 4), or whether the MP will be operating in the deep sleep mode, and active only during its own beacon and ATIM times (as in FIG. 5).

In general, the frame to indicate a power mode transition may be, for example, a mesh data frame (QoS Data frame plus Mesh headers) or a mesh Null frame QoS-Null plus Mesh headers), both of which may be unicast frames. A group-cast frame that contains Mesh headers may be used to change the power mode as well. For example, a Mesh Beacon frame may be used to change the power mode. Thus, and in general, a directed frame transmission may be considered as a unicast mesh data frame or a mesh-null frame. That is, the frame transmission to indicate a power mode transition may be beacon frame transmission (or more generally a groupcast transmission) or it may be a directed frame transmission.

Figure 1:
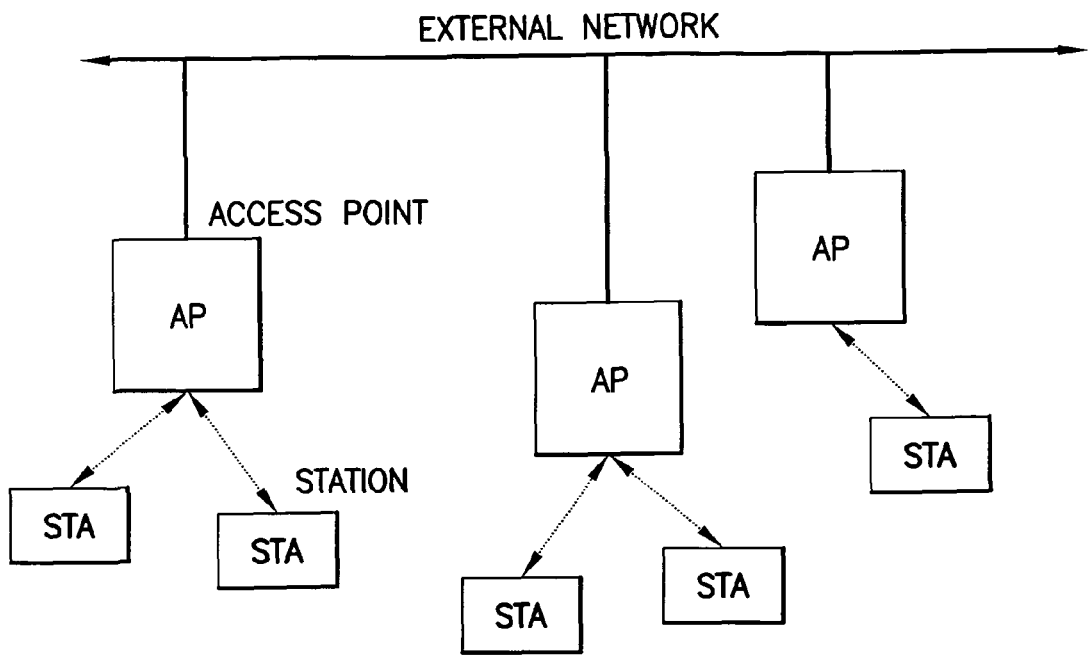
FIG. 1 reproduces Figure s1 of the IEEE P802.11s™ Draft Standard, and shows a non-mesh IEEE 802.11 deployment model and device classes.
Figure 2:
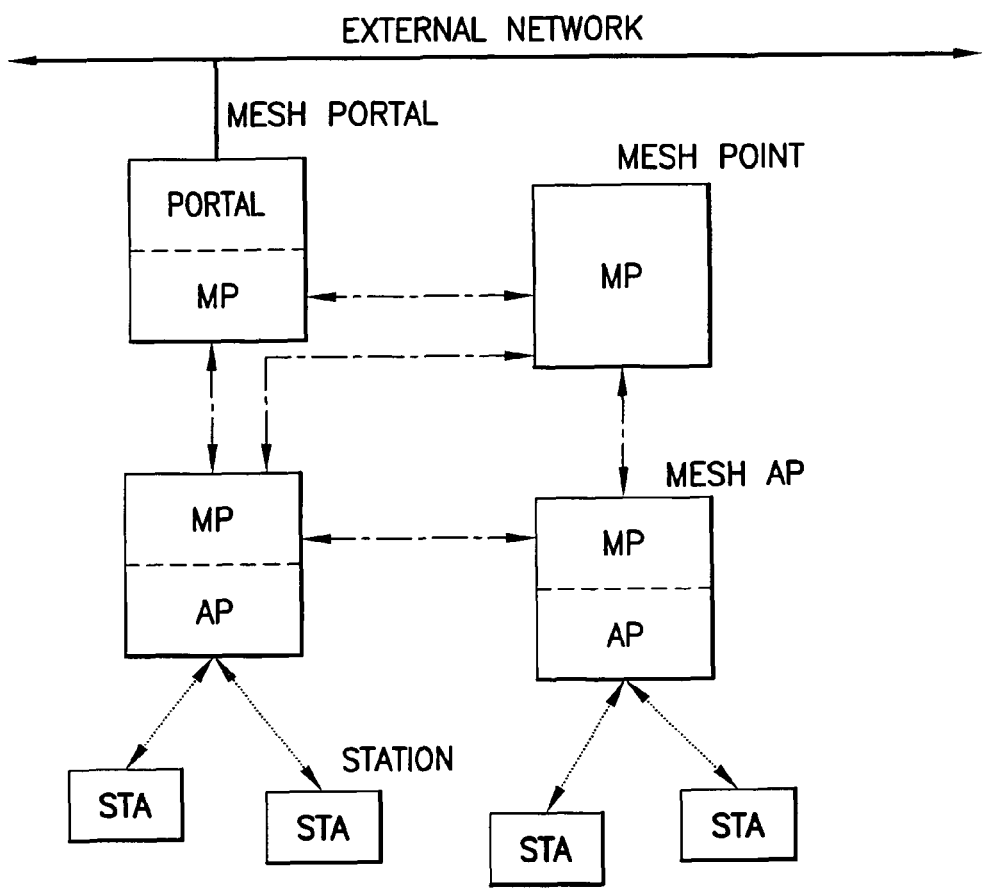
FIG. 2 reproduces Figure s2 of the IEEE P802.11s™ Draft Standard, and shows a mesh containing MPs, MAPs, and STAs.
Figure 3A:
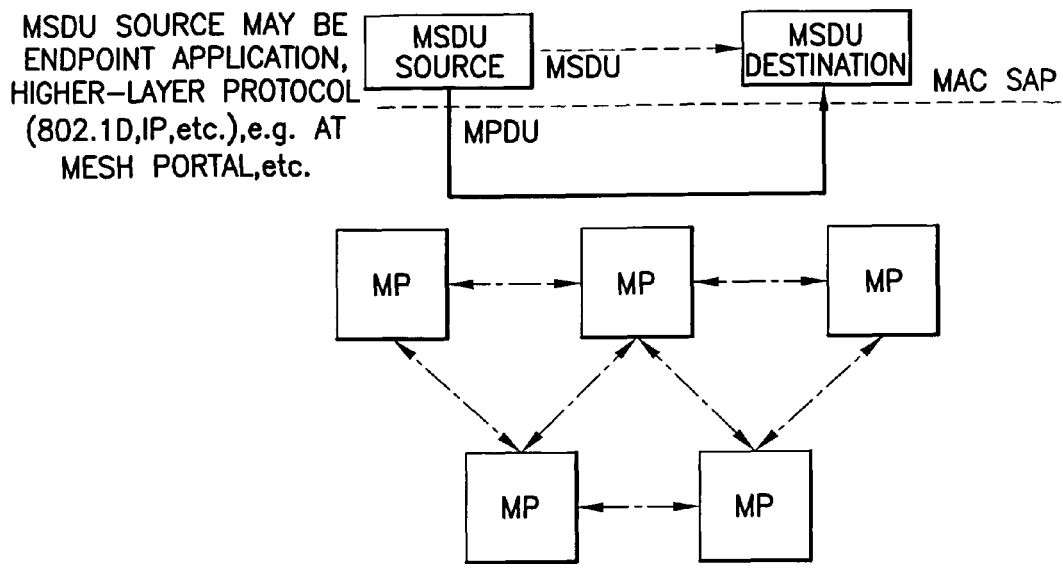
FIG. 3A reproduces Figure s3 of the IEEE P802.11s™ Draft Standard, and shows MAC data transport over a Mesh.
Figure 3B:
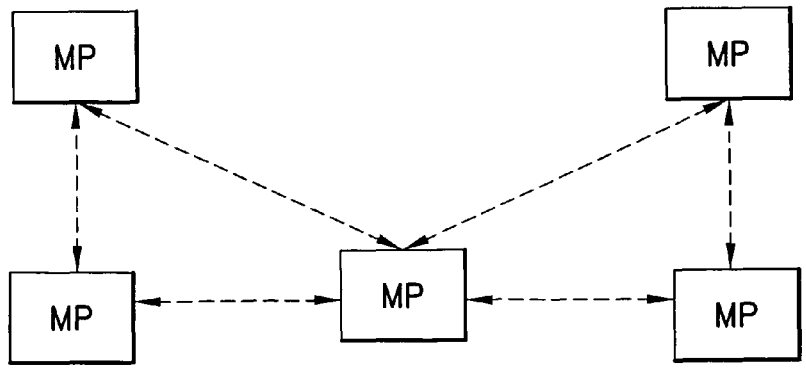
FIG. 3B depicts an exemplary ad hoc one hop networking model.
Figure 4:
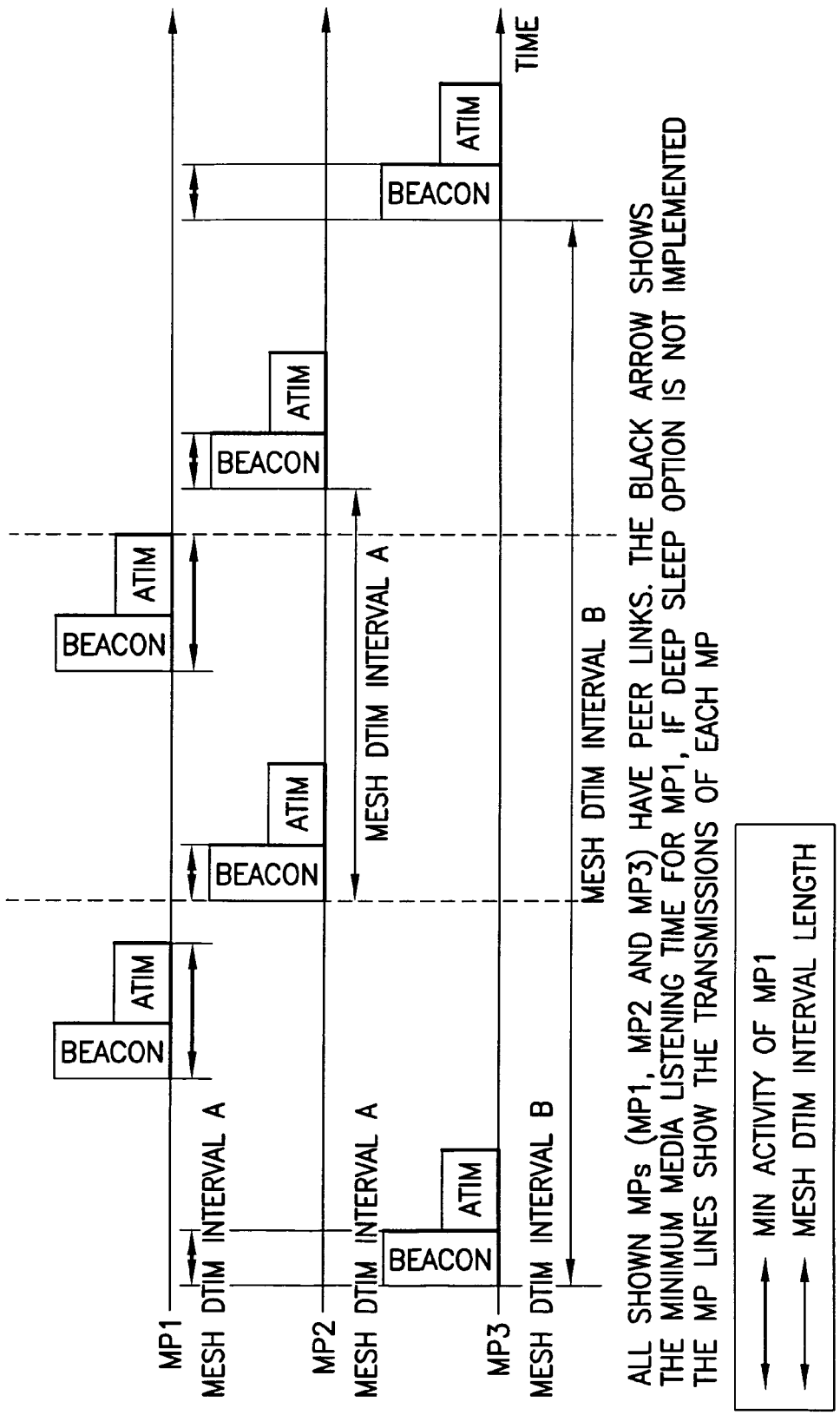
FIG. 4 illustrates beacon reception, when the deep sleep operational mode in accordance with this invention is not used.
Figure 5:
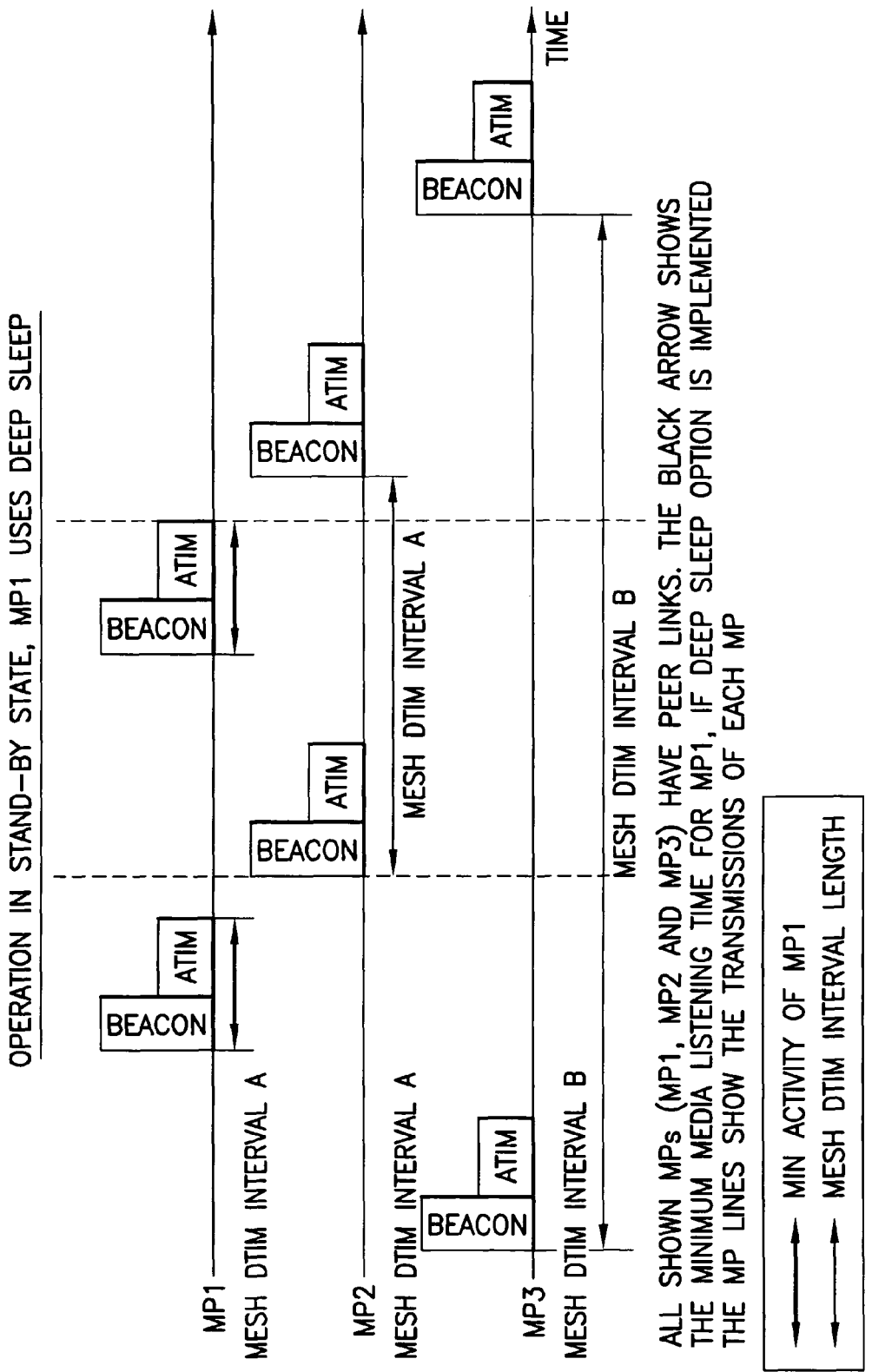
FIG. 5 illustrates beacon reception, when the deep sleep operational mode in accordance with this invention is used.

FIG. 4 illustrates beacon reception when the deep sleep operational mode in accordance with this invention is not used, while FIG. 5 illustrates beacon reception when the deep sleep operational mode in accordance with this invention is used. Note in FIG. 4 that the MP 1 must be active during its own beacon and ATIM times, and also during the beacon transmission times of each of MP 2 and MP 3 (assumed in this example to operate with Mesh DTIM periods (intervals) A and B, respectively). This mode of operation can be contrasted with that shown in FIG. 5, where the MP 1 need be active only during its own beacon and ATIM times. The resultant savings in power consumption are thus significant, as it can be noticed that the number of activity periods of MP 1 is reduced when the deep sleep mode is used.

If the MP is operating in the deep sleep mode (the deep sleep bit is set to 1), the MP may be woken up with a frame, such as the ATIM frame transmitted during the ATIM period after the beacon transmission of the MP. Note in this regard that the ATIM period is used only for wakeup frame transmissions. The ATIM frame is currently such a frame with which a sleeping MP can be informed that there is data for it in some peer MP's buffers. The MP in deep sleep mode should preferably stay awake (active) for a longer time period until there is no further data to be exchanged with the peer MP. All standard rules and conventions regarding, for example, service period and additional ATIM period can be applied to determine when the MP reenters the deep sleep mode.

Stated differently, upon reception of such a wakeup frame from a peer MP, the MP operating in the sleep mode will stay awake until the reason for the wakeup has ceased. In a conventional sleep mode the MP receives beacons and TIM bits from all other peer MPs, and may also use PS-POLL or other power save mechanisms to initiate data transmission. Note that in this context other MPs may generally be any neighboring MP, while a peer MP is an MP with which this MP has created a peer link.

The MP may receive a frame from peer MPs within a link timeout value in order to maintain the peer link active. The link timeout value is typically comprised of multiple MESH DTIM periods.

One implementation option for maintaining the peer links active is to set all non-deep sleeping MPs to send an acknowledged frame during the ATIM period of the deep sleep MP. Thus, the deep sleep MP needs only to listen to the media during its own beacon and ATIM period, and to receive beacons from peer MPs, which are also operating in the deep sleep mode.

The frame transmission during the deep sleep MPs ATIM period beneficially reduces the time that the deep sleep MP is required to listen to the media, and on the other hand may increase the amount of traffic during the ATIM period of the deep sleep MP.

The use of these exemplary embodiments can be beneficial in all WLAN MPs which are capable of operating in a power save state.

The exemplary advantages that are realized by the use of these embodiments of the invention are numerous. For example, the deep sleep mode enables the MP to minimize the stand-by power consumption by enabling the MP to stay active only during its beacon transmission time. In addition, the stand-by power consumption in the deep sleep operation mode can be readily estimated. Further, the amount of sleep is no longer as dependent on the number of the links in the MP, and the beacon transmission times of the MPs.

Other potential solutions to reduce the stand-by power consumption of the MP could include organizing the beacon transmissions times to be close together. An extreme example would be the UWB beaconing approach discussed in the ECMA-368 Standard. However, this type of beacon organization would cause difficulties related to notifying other MPs that the beacon transmission time has changed, and can lead to collisions of the beacon frames. Also, if there is more than one MESH DTIM period in use, the beacon transmission times can become very difficult or impossible to organize due to the differences in the beacon transmission periodicity.

It may be preferred in the exemplary embodiments of this invention that the MP in deep sleep mode wakes up to receive a frame from peer MPs, although this may also increase power consumption.

The use of the deep sleep mode in accordance with this invention differs from the hibernation approach disclosed in the above-referenced ECMA-368 Standard (UWB). For example, in UWB the device does not send its own beacon during the hibernation mode. Further by example, in the UWB approach the device informs other devices before hibernating how long it will stay in hibernation mode. This is clearly different than the approach taken by the exemplary embodiments of this invention, where the MP informs other MPs in beacon or other directed frame transmission whether its mode will be deep sleep or active, thereby simplifying the overall coordination of the mesh network devices.

Figure 6:
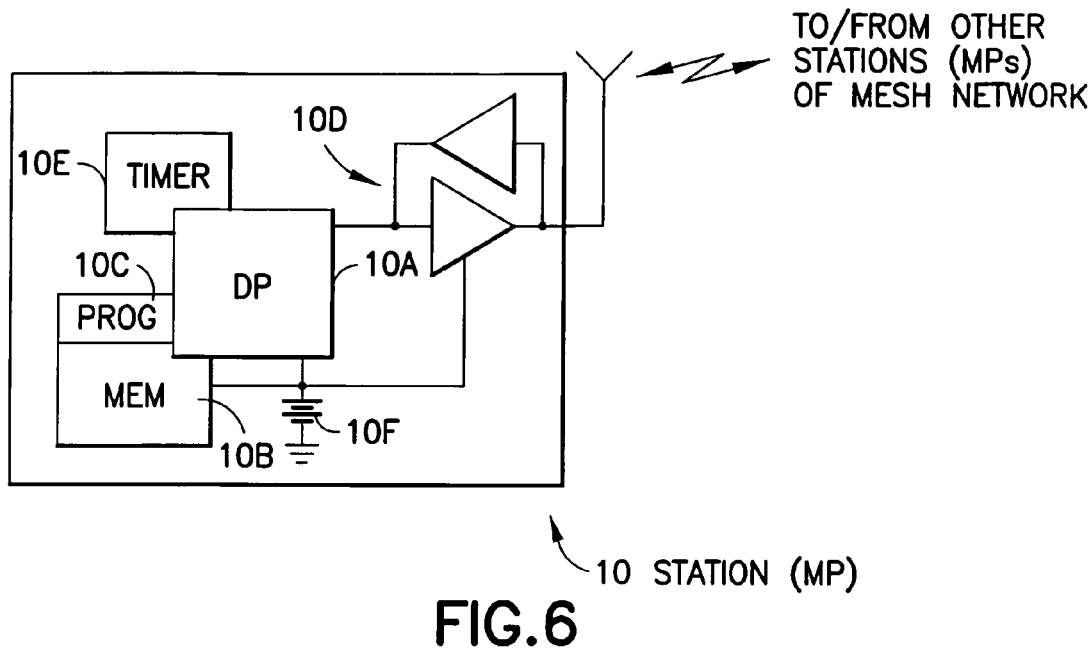
FIG. 6 is a simplified block diagram of a wireless station or mesh point that is suitable for use in implementing the exemplary embodiments of this invention.

Reference is made to FIG. 6 for illustrating a simplified block diagram of a MP or station 10 that is suitable for use in practicing the exemplary embodiments of this invention. The station 10 includes a controller, such as one embodied as at least one data processor (DP) 10A, a computer-readable memory medium (MEM) 10B that stores program instructions (PROG) 10C, and a suitable radio frequency (RF) transceiver 10D that enables the station 10 to achieve bidirectional wireless communication with at least other MPs (not shown) with which the station 10 has links (peer MPs). The PROG 10C is assumed to include program instructions that, when executed by the associated DP 10A, enable the station 10 to operate in accordance with the exemplary embodiments of this invention as described herein. The station 10 may include some type of suitable hardware and/or software based timer function 10E used for waking up the station 10, such as by generating an interrupt to the processor 10A, prior to the time it needs to transmit its beacon containing the indication of whether or not the station 10 is operating in the deep sleep mode. It should be noted that some type of directed frame transmission, and not a beacon frame transmission, may be used to carry the indication of whether or not the station 10 is operating in the deep sleep mode. When in the deep sleep mode it is assumed that suitable arrangements are made for reducing or switching off the voltage to various components of the station 10, thereby reducing overall power consumption of a battery 10F (which is assumed to be associated with suitable power conditioning and supply circuitry, as is well known).

In general, the exemplary embodiments of this invention may be implemented at least in part by computer software executable by the DP 10A of the station 10, or by hardware, or by a combination of software and hardware (and firmware).

In general, the various embodiments of the station 10 can include, but are not limited to, wireless communication devices including phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Based on the foregoing it should be apparent that the exemplary embodiments of this invention provide a method, apparatus and computer program product(s) to reduce power consumption of a MP operating in a mesh or mesh-like network.

Figure 7:
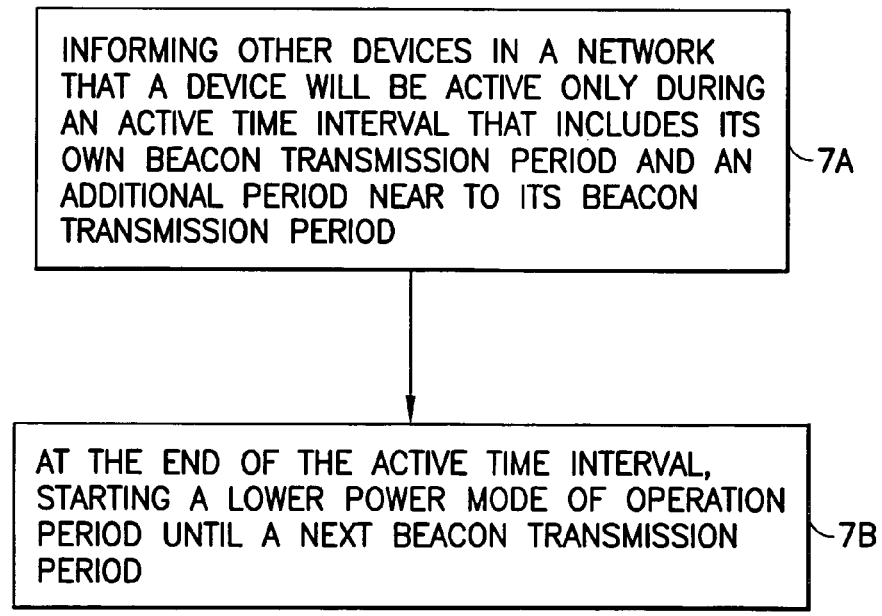
FIG. 7 is a logic flow diagram that depicts execution of a method, and a result of execution of computer program instructions, in accordance with the exemplary embodiments of this invention.

In accordance with these exemplary embodiments, and referring to FIG. 7, a method for execution in a mesh network comprises informing other devices in the network in a beacon frame transmission or in a directed frame transmission of a device, that the device will be active only during an active time interval that includes its own beacon transmission period and an additional period near to its beacon transmission period (Block 7A), and at the end of the active time interval, starting a lower power mode of operation period until a next beacon transmission period (Block 7B).

In the method of the previous paragraph, where the lower power mode of operation period does not include listening to the beacons of other devices to which the device has links.

In the method of the previous paragraphs, where the device optionally exits the lower power mode of operation period occasionally in order to listen to the beacons of other devices for at least synchronization and link maintenance purposes.

In the method of the previous paragraphs, where the device receives data from the other devices to which the device has links only during the additional period.

In the method of the previous paragraphs, where the additional period corresponds to an announcement traffic indication message period.

Figure 8:
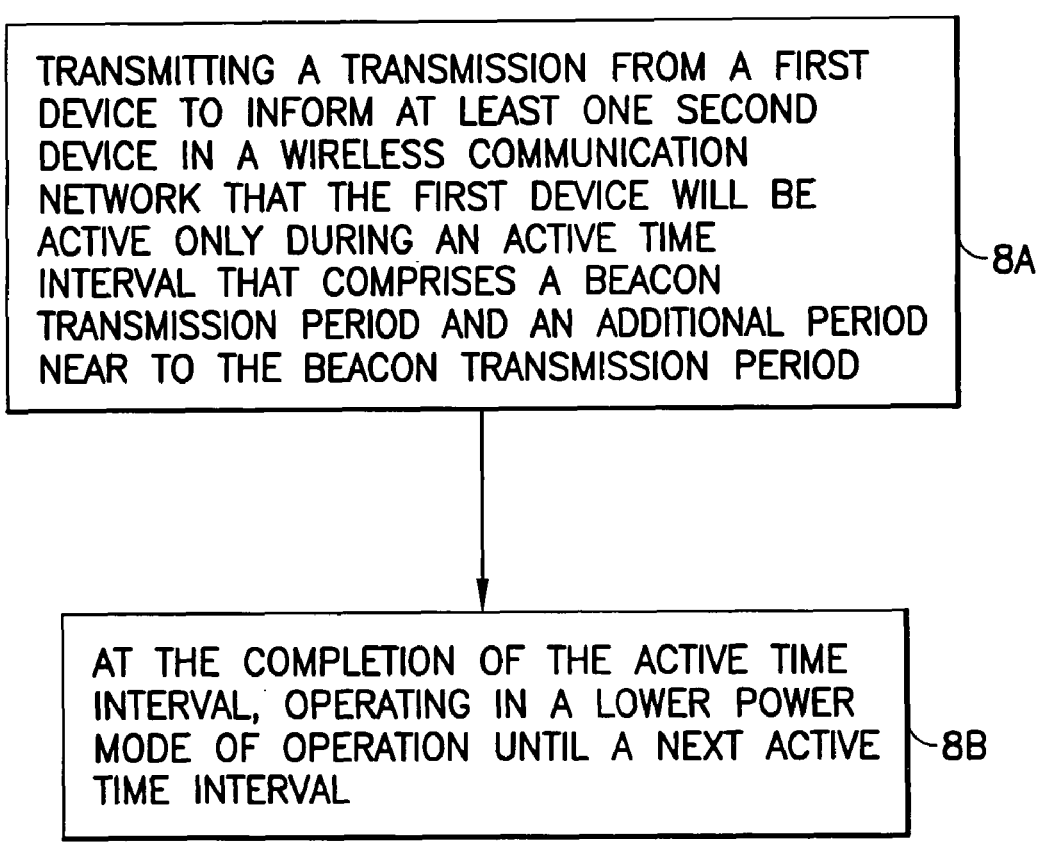
FIG. 8 is a logic flow diagram that depicts execution of a method, and a result of execution of computer program instructions, in accordance with the exemplary embodiments of this invention.

Further in accordance with these exemplary embodiments, and referring to FIG. 8, a method comprises (Block 8A) transmitting a beacon transmission or a directed frame transmission from a first device to inform at least one second device in a wireless communication network that the first device will be active only during an active time interval that comprises a beacon transmission period and an additional period near to the beacon transmission period and, (Block 8B) at the completion of the active time interval, operating in a lower power mode of operation until a next active time interval.

In the method of the previous paragraph, where when operating in the lower power mode of operation, the first device does not receive a beacon transmission from the at least one second device.

In the method of the previous paragraphs, further comprising exiting the lower power mode of operation prior to a start of the next active time interval to receive a beacon transmission from the at least one second device.

In the method of the previous paragraphs, where the first device receives the beacon transmission from the at least one second device for at least synchronization and link maintenance purposes.

In the method of the previous paragraphs, where the first device has a link with the at least one second device, and further comprising receiving data, only during the additional period, from the at least one second device.

In the method of the previous paragraphs, where the additional period corresponds to an announcement traffic indication message period.

In the method of the previous paragraphs, where the first device transmits in the beacon or other directed frame transmission an indication that the first device will be active only during the active time interval, or an indication that the first device will be active for a longer period than the active time interval.

In the method of the previous paragraphs, where the first device transmits in the beacon or other directed frame transmission an indication of whether (a) the first device will not be active to receive a transmission from the second device after expiration of a period of time corresponding to an announcement traffic indication message, or (b) the first device will be active to receive a transmission from the second device after expiration of the period of time corresponding to the announcement traffic indication message.

In the method of the previous paragraphs, where said wireless communication network is comprised of a mesh network comprising a plurality of mesh points, and where said first device and said at least one second device are each a mesh point.

The various blocks shown in FIGS. 7 and 8 may be viewed as method steps, and/or as operations that result from operation of computer program code, and/or as a plurality of coupled logic circuit elements constructed to carry out the associated function(s).

The exemplary embodiments of this invention also provide a mesh point device that comprises a wireless transceiver configurable for communication with other mesh point devices, and that further comprises a data processor that operates under the control of a stored program to inform other mesh point devices in a mesh network, in a beacon or a directed frame transmission, that the mesh point device will be active only during an active time interval that comprises its own beacon transmission period and an additional period near to its beacon transmission period. At the end of the active time interval the data processor further operates to initiate a lower power mode of operation period until a next beacon transmission period. During the lower power mode of operation period the mesh point device does not receive through its wireless transceiver and respond to the beacons of other devices to which the mesh point device has links.

The mesh point device may optionally exit the lower power mode of operation period occasionally in order to receive and respond to the beacons of other devices for at least synchronization and link maintenance purposes.

The mesh point device receives data from the other devices to which the device has links only during the additional period, where the additional period corresponds to an announcement traffic indication message period.

The exemplary embodiments of this invention also provide an apparatus that comprises means for informing other apparatus in a mesh network, using a beacon or a directed frame transmission, that the apparatus will be active only during an active time interval that comprises its own beacon transmission period and an additional period near to its beacon transmission period, and further comprises means, responsive to an end of the active time interval, for entering lower power mode of operation period until a next beacon transmission period.

In the apparatus of the previous paragraph, where the lower power mode of operation period does not include listening to the beacons of other devices to which the device has links.

In the apparatus of the previous paragraphs, further comprising means for occasionally exiting the lower power mode of operation period to listen to the beacons of other apparatus for at least synchronization and link maintenance purposes.

In the apparatus of the previous paragraphs, where the apparatus further comprises means for receiving data from the other apparatus s to which the apparatus has links only during the additional period, where the additional period corresponds to an announcement traffic indication message period.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed the resultant design may be fabricated as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, in other embodiments of this invention the MP may be active (not in deep sleep) only when it sends its own beacon, and may not attempt to receive transmissions from other MPs, such as peer MPs.

Further by example, while the exemplary embodiments have been described above in the general context of the IEEE 802.11 system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   transmitting, in a wireless mesh network enabling multi-hop communication, a transmission from a first device to inform at least one second device whether the first device will operate according to a first mode or to a second mode,
   wherein in the first mode the first device will be active only during an active time interval that comprises a beacon transmission period of the first device and an additional period near to the beacon transmission period of the first device, and
   wherein in the second mode the first device will be active during the active time interval that comprises the beacon transmission period of the first device and the additional period near to the beacon transmission period of the first device, and during a beacon transmission period of the at least one second device,
   the first device having a separate beacon transmission period from the at least one second device; and
   at the completion of the active time interval, operating the first device in a lower power mode of operation until a next active time interval in the first or second mode, or until a next beacon transmission period of the at least one second device in the second mode.

2. The method of claim 1, where when operating in in the first mode the lower power mode of operation the first device does not receive a beacon transmission from the at least one second device.

3. The method of claim 1, further comprising exiting in the first mode the lower power mode of operation prior to a start of the next active time interval to receive a beacon transmission from the at least one second device during the beacon transmission period of the at least one second device.

4. The method of claim 3, where the first device receives the beacon transmission from the at least one second device for at least synchronization and link maintenance purposes.

5. The method of claim 1, where the first device has a link with the at least one second device, and the method further comprising receiving data, only during the additional period, from the at least one second device.

6. The method of claim 1, where the additional period corresponds to an announcement traffic indication message period.

7. The method of claim 1, where the first device transmits an indication that the first device will be active only during the active time interval, or an indication that the first device will be active for a longer period than the active time interval.

8. The method of claim 1, where the first device transmits an indication of whether (a) the first device will not be active to receive a transmission from the second device after expiration of a period of time corresponding to an announcement traffic indication message, or (b) the first device will be active to receive a transmission from the second device after expiration of the period of time corresponding to the announcement traffic indication message.

9. The method of claim 1, where said wireless mesh network comprises a plurality of mesh points, and where said first device and said at least one second device are each a mesh point.

10. An apparatus, comprising:
a wireless transmitter and receiver; and
a controller configured to transmit, in a wireless mesh network enabling multi-hop communication, a transmission from a first device to inform at least one second device whether the first device will operate according to a first mode or to a second mode,
wherein in the first mode the first device will be active only during an active time interval that comprises a beacon transmission period of the first device and an additional period near to the beacon transmission period of the first device, and
wherein in the second mode the first device will be active during the active time interval that comprises the beacon transmission period of the first device and the additional period near to the beacon transmission period of the first device, and during a beacon transmission period of the at least one second device,
the first device and the at least one second device having separate beacon transmission periods, said controller further configured, at an expiration of the active time interval, to cause said first device to enter a lower power mode of operation until a next active time interval in the first or second mode, or until a next beacon transmission period of the at least one second device in the second mode.

11. The apparatus of claim 10, where in the first mode of the lower power mode of operation the first device does not receive a beacon transmission from the at least one second device.

12. The apparatus of claim 10, said controller further configured to exit the first mode of the lower power mode of operation prior to a start of the next active time interval to receive a beacon transmission from the at least one second device during the beacon transmission period of the at least one second device.

13. The apparatus of claim 12, where the first device receives the beacon transmission from the at least one second device for at least synchronization and link maintenance purposes.

14. The apparatus of claim 10, where the first device has a link with the at least one second device, and said controller is further configured to receive data, only during the additional period, from the at least one second device.

15. The apparatus of claim 10, where the additional period corresponds to an announcement traffic indication message period.

16. The apparatus of claim 10, where said controller is further configured to transmit an indication that the first device will be active only during the active time interval, or an indication that the first device will be active for a longer period than the active time interval.

17. The apparatus of claim 10, where said controller is further configured to transmit an indication of whether (a) the first device will not be active to receive a transmission from the second device after expiration of a period of time corresponding to an announcement traffic indication message, or (b) the first device will be active to receive a transmission from the second device after expiration of the period of time corresponding to the announcement traffic indication message.

18. The apparatus of claim 10, where said wireless mesh network comprises a plurality of mesh points, and where said first device and said at least one second device are each a mesh point.

19. The apparatus of claim 10, embodied as at least one integrated circuit 20.

20. A computer-readable memory medium that stores program instructions, the execution of which result in operations that comprise:
transmitting, in a wireless mesh network enabling multi-hop communication, a transmission from a first device to inform at least one second device whether the first device will operate according to a first mode or to a second mode,
wherein in the first mode the first device will be active only during an active time interval that comprises a beacon transmission period of the first device and an additional period near to the beacon transmission period of the first device, and
wherein in the second mode the first device will be active during the active time interval that comprises the beacon transmission period of the first device and the additional period near to the beacon transmission period of the first device, and during a beacon transmission period of the at least one second device,
the first device and the at least one second device having separate beacon transmission periods; and
at the completion of the active time interval, operating the first device in a lower power mode of operation until a next active time interval in the first or second mode, or until a next beacon transmission period of the at least one second device in the second mode.

21. The computer-readable memory medium of claim 20, where when operating in the first mode of the lower power mode of operation the first device does not receive a beacon transmission from the at least one second device.

22. The computer-readable memory medium of claim 20, further comprising exiting the first mode of the lower power mode of operation prior to a start of the next active time interval to receive a beacon transmission from the at least one second device during the beacon transmission period of the at least one second device.

23. The computer-readable memory medium of claim 22, where the first device receives the beacon transmission from the at least one second device for at least synchronization and link maintenance purposes.

24. The computer-readable memory medium of claim 20, where the first device has a link with the at least one second device, and further configured to receive data, only during the additional period, from the at least one second device.

25. The computer-readable memory medium of claim 20, where the additional period corresponds to an announcement traffic indication message period.

26. The computer-readable memory medium of claim 20, where the first device transmits an indication that the first device will be active only during the active time interval, or an indication that the first device will be active for a longer period than the active time interval.

27. The computer-readable memory medium of claim 20, where the first device transmits an indication of whether (a) the first device will not be active to receive a transmission from the second device after expiration of a period of time corresponding to an announcement traffic indication message, or (b) the first device will be active to receive a transmission from the second device after expiration of the period of time corresponding to the announcement traffic indication message.

28. The computer-readable memory medium of claim 20, where said wireless mesh comprises a plurality of mesh points, and where said first device and said at least one second device are each a mesh point.

29. An apparatus, comprising:
  means for transmitting a transmission, in a wireless mesh network enabling multi-hop communication, from a first device to inform at least one second device whether the first device will operate according to a first mode or to a second mode,
  wherein in the first mode the first device will be active only during an active time interval that comprises a beacon transmission period of the first device and an additional period near to the beacon transmission period of the first device, the first device and the at least one second device having separate beacon transmission periods, and
  wherein in the second mode the first device will be active during the active time interval that comprises the beacon transmission period of the first device and the additional period near to the beacon transmission period of the first device, and during a beacon transmission period of the at least one second device; and
  means, responsive to a completion of the active time interval, for controlling said first device to operate in a lower power mode of operation until a next active time interval in the first or second mode, or until a next beacon transmission period of the at least one second device in the second mode.

30. The apparatus of claim 29, said controlling means further operable to exit the lower power mode of operation prior to a start of the next active time interval to receive a beacon transmission from the at least one second device during the beacon transmission period of the at least one second device.

31. The apparatus of claim 29, where the additional period corresponds to an announcement traffic indication message period.

32. The apparatus of claim 29, where said transmitting means transmits an indication of whether (a) the first device will not be active to receive a transmission from the second device after expiration of a period of time corresponding to an announcement traffic indication message, or (b) the first device will be active to receive a transmission from the second device after expiration of the period of time corresponding to the announcement traffic indication message.

33. The apparatus of claim 29, where said first device and said at least one second device are each a mesh point in the wireless mesh network.

34. The apparatus of claim 29, embodied as at least one integrated circuit.

35. The apparatus of claim 29, where said transmitting means transmits a groupcast frame transmission or a directed frame transmission.

\* \* \* \* \*